United States Patent [19]
McNally

[11] Patent Number: 6,019,590
[45] Date of Patent: Feb. 1, 2000

[54] SLUSH MOLDING APPARATUS

[75] Inventor: Douglas J. McNally, Chatham, Canada

[73] Assignee: Konal Engineering and Equipment Inc., Blenheim, Canada

[21] Appl. No.: 08/867,541

[22] Filed: Jun. 2, 1997

[51] Int. Cl.$^7$ .................................................. B29C 41/46
[52] U.S. Cl. ......................... 425/470; 425/144; 425/435; 264/302; 264/303
[58] Field of Search ..................... 264/301, 302, 264/303, 304, 305, 306; 425/144, 435, 270; 249/79

[56] References Cited

U.S. PATENT DOCUMENTS

| | | | |
|---|---|---|---|
| 1,843,786 | 2/1932 | Robinson | 415/119 |
| 2,588,571 | 3/1952 | Porter | 264/302 |
| 3,728,429 | 4/1973 | Colby et al. | |
| 3,775,590 | 11/1973 | Gartner | 219/366 |
| 4,621,995 | 11/1986 | Wersosky | |
| 4,623,503 | 11/1986 | Anestis et al. | |
| 4,664,864 | 5/1987 | Wersosky | |
| 4,683,098 | 7/1987 | Belleville et al. | |
| 4,718,140 | 1/1988 | Johnson | 15/330 |
| 4,790,510 | 12/1988 | Takamatsu et al. | |
| 4,851,177 | 7/1989 | Gray | |
| 4,890,995 | 1/1990 | Gray | |
| 4,898,697 | 2/1990 | Horton | |
| 5,032,076 | 7/1991 | Jackson, Jr. | |
| 5,094,608 | 3/1992 | Piazza et al. | |
| 5,106,285 | 4/1992 | Preston | |
| 5,221,539 | 6/1993 | Pallerberg et al. | |
| 5,443,777 | 8/1995 | Mills | |
| 5,445,510 | 8/1995 | Jackson, Jr. | |

Primary Examiner—Jan H. Silbaugh
Assistant Examiner—Stefan Staicovici
Attorney, Agent, or Firm—Flynn, Thiel, Boutell & Tanis, P.C.

[57] ABSTRACT

A molding apparatus and method, such as slush or rotational molding, for forming a thermoplastic shell product. The mold assembly includes a hollow mold box provided with a metal mold shell thereon, which box and shell cooperate to define a hollow chamber which extends longitudinally of the box and is defined adjacent the back surface of the mold shell. Heated air is supplied into one end and discharged from the other end of the chamber to effect heating of the metal shell. The chamber contains a plurality of flow control devices disposed at spaced intervals within and along the chamber. The flow control devices are individually adjustable and programmable so as to divert the heated air from conventional longitudinal flow into transverse flow either toward or away from the back surface of the mold shell.

11 Claims, 5 Drawing Sheets

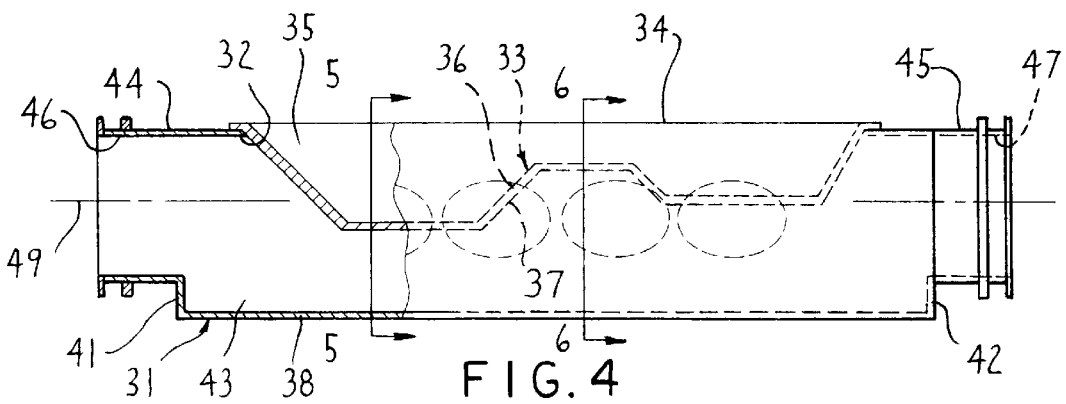
FIG. 4
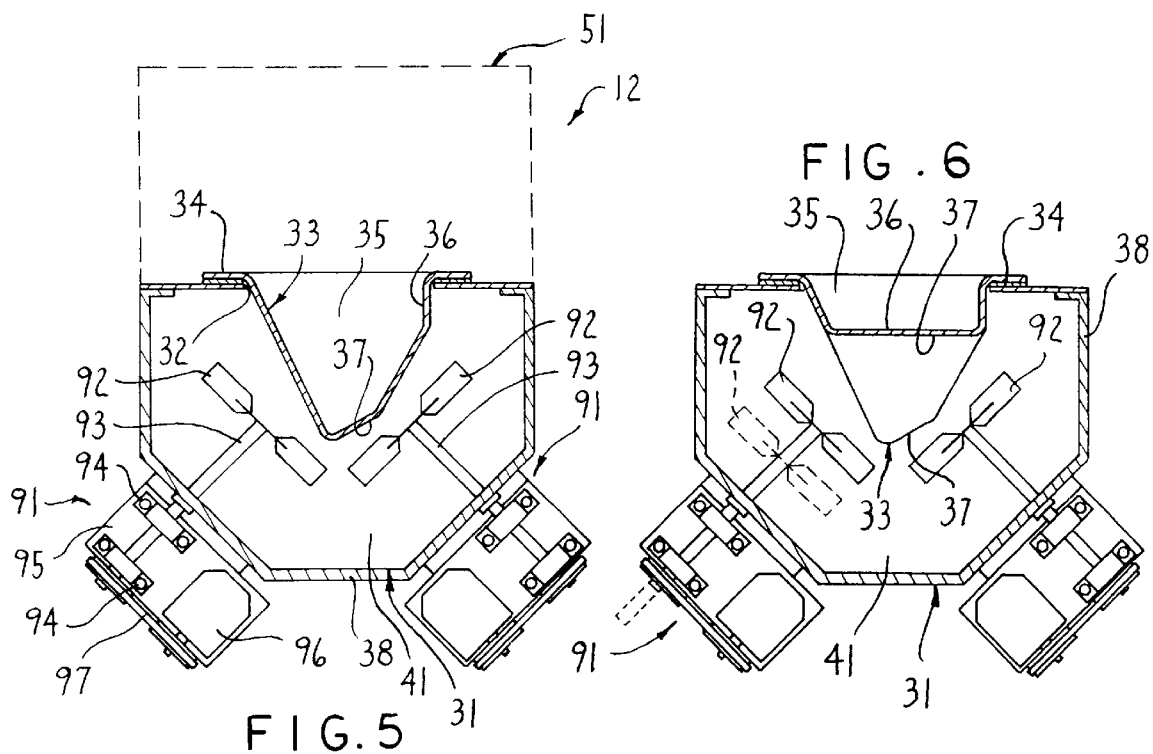
FIG. 5
FIG. 6
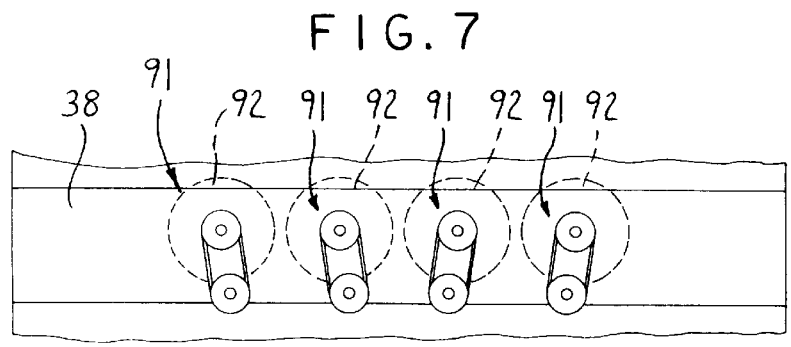
FIG. 7

1

SLUSH MOLDING APPARATUS

FIELD OF THE INVENTION

This invention relates to a molding method and apparatus employing a metal shell mold having a back surface exposed to a heat source and an inner surface heated to a temperature at which heat gelable thermoplastic material deposited on the inner surface fuses into a thin solid thermoplastic molded product, often referred to as a shell or skin.

BACKGROUND OF THE INVENTION

Thermoplastic powder or slurries, known as dry or liquid plastisols, are conventionally cast on the inner surface of a thin metal mold member heated to the fusion temperature of the deposited material to form a gel coat which is heated sufficiently to form a thin, solid thermoplastic molded member (i.e., a shell or skin). The thin metal mold member remains heated until a thin layer of thermoplastic material is built up on the inner surface to form a thin plastic shell product, such as a product suitable for use as an outer skin or shell covering on automotive interior or exterior products such as door panels, instrument panels, bumper moldings or the like.

The method and apparatus for the production of molded skins or shells are well known, such methods often being referred to as "rotational" or "slush" molding. The mold cavity defined by the mold shell is filled with a flowable plastic material and, due to heating of the mold shell, a thin layer of plastic material adheres to the surface of the mold shell and the remaining plastic material can then be shaken or poured out of the mold, as by rotating the mold. When the mold shell is further heated, the skin or shell product clinging thereto gels out. The finish skin or shell product can then be removed after the mold has cooled down. The operation of introducing the plastic material, when in the form of a powder or granule, is typically effected by rotating the mold so that its mold cavity opens downwardly, and then fixing onto the mold a box which contains the plastic material. The overall assembly consisting of the mold and box is then rotated through about 180° so that the plastic material drops into the mold. After the plastic skin or shell has set against the heated mold surface, the mold assembly is rotated back to its original position and the box and excess powder removed, with further heating of the mold then effecting proper melting and gelling of all of the plastic material adhered to the mold surface. The mold is then cooled and the molded skin or shell product removed.

In a typical rotational molding apparatus of the type briefly described above, the mold assembly includes a generally hollow mold housing or box on which the metal mold shell is mounted, which housing and mold shell cooperate to define a hollow interior chamber to which heated air is supplied so as to effect heating of the mold shell from the back surface thereof. This heating of the mold shell, however, has long presented a technical problem since the irregularity in the shape of the mold shell and the length thereof have often made it difficult to provide the desired degree of heat uniformity as applied to the mold shell throughout the back surface area thereof. The mold shell thus often has undesired hot or cold spots which effect the quality (i.e., both thickness and finished surface properties) of the molded skin product. In an attempt to provide better control over the heat applied to the back surface of the mold shell, various complex flow control arrangements have been proposed, including providing the chamber rearward of the mold shell with a plate having numerous pipes or nozzles thereon for directing flow of heated air to specific areas or regions defined on the back surface of the mold shell. Such arrangements, however, are structurally complex and expensive, and in particular require that a different nozzle or pipe arrangement be designed for cooperation with each mold shell.

The prior arrangements also typically perform the entire molding sequence at a single working station, such as by first preheating the mold, then attaching the mold powder box to deposit the powder in the mold, then further heating the mold to effect complete gelling of the powder material to define the molded skin product, and thereafter cooling the mold and effecting removal of the skin product, prior to initiating a new cycle. Due to the requisite time required to properly effect both heating and cooling, the overall product forming cycle is often undesirably long, and thus the single station mold lacks desired productivity and efficiency.

It is an object of this invention to provide an improved molding apparatus and method, such as a slush or rotational molding apparatus and method, for forming a thin skin or shell product, which improved method and apparatus is believed to significantly improve the overall performance characteristics of the apparatus and process in terms of efficiency and rate of productivity, and is also believed to provide for more desirable control over the supplying of heat to the back surface of the mold shell by utilizing a simple and readily adjustable flow control arrangement, thereby providing for the necessary control over the heating of the shell to provide a desirable molded skin product.

In the improved process and apparatus of the present invention, the mold assembly includes a hollow box on which a conventional metal mold shell is mounted, which box and shell cooperate to define a hollow chamber which extends longitudinally of the box and is defined adjacent the back surface of the metal mold shell. Heated air is supplied into one end and discharged from the other end of the chamber to effect heating of the metal shell. The chamber contains therein a plurality of flow control devices which are disposed at spaced intervals within and along the chamber and are adjustable and programmable so as to divert the heated air from conventional longitudinal flow into transverse flow either toward or away from the back surface of the metal mold shell. In the preferred embodiment the flow control device includes a rotatable fan wheel which is positioned within the chamber and, when rotated, effects flow of heated air axially thereof in a direction transverse of the chamber. The fan wheel is driven by a reversible variable-speed motor so that the fan wheel can direct heated air either toward or away from the adjacent back surface of the mold shell, and the speed of the fan wheel can be varied so as to also adjust the quantity of heated air which is directed toward or away from the adjacent back surface of the mold shell. The numerous flow control devices have the motors thereof individually controlled by a control arrangement which enables all of the flow control devices to be individually controlled, both with respect to their on-off cycle, and also with respect to flow direction and speed, to thus provide for rather close control over the amount of heated air which is permitted to directly contact the back surface of the metal mold shell so as to provide for desirable control over the heating of the mold shell throughout the entire surface area thereof. With the arrangement of this invention, the individual flow control devices can each be individually programmed in terms of on-off cycle, direction of rotation, and speed of rotation so as to provide for optimum heating of the adjacent back surface of the metal mold shell, and can also be readily adjusted so as to adjust or accommodate metal mold shells of different configurations or shapes.

The improved process and apparatus of this invention also preferably includes a structure employing a movable carriage or shuttle on which a pair of mold assemblies are provided, which shuttle arrangement can be driven back and forth so as to alternately position one of the mold assemblies in alignment with a source of heated air to effect heating of the mold and deposit of plastic powder and gelling of powder onto the mold surface. When the molding of the skin product has been completed, the shuttle is then shifted into an alternate position so that the mold containing the skin product is shifted into a cooling station and subjected to cooling, such as water or air, and the other mold assembly is then in the heating and mold forming station. While the other mold assembly is in the heating and mold forming station, the first mold assembly is being cooled and the molded skin removed, whereby the first mold assembly is now capable of being moved back to the heating station for performing a further molding operation.

The advantageous arrangement and method of the present invention, and the objects and purposes thereof, will be apparent to persons familiar with molding of this general type upon reading the following specification and inspecting the accompanying drawings.

BRIEF DESCRIPTION OF THE DRAWINGS

FIG. 4 is a side elevational view, partially in cross section, of solely the mold box and the metal mold shell mounted thereon.

FIGS. 5 and 6 respectively are cross sectional view taken generally along lines 5—5 and 6—6 in FIG. 4.

FIG. 7 is a fragmentary view showing the longitudinal exterior of the mold box and the plurality of flow control devices mounted thereon.

Figure 1:
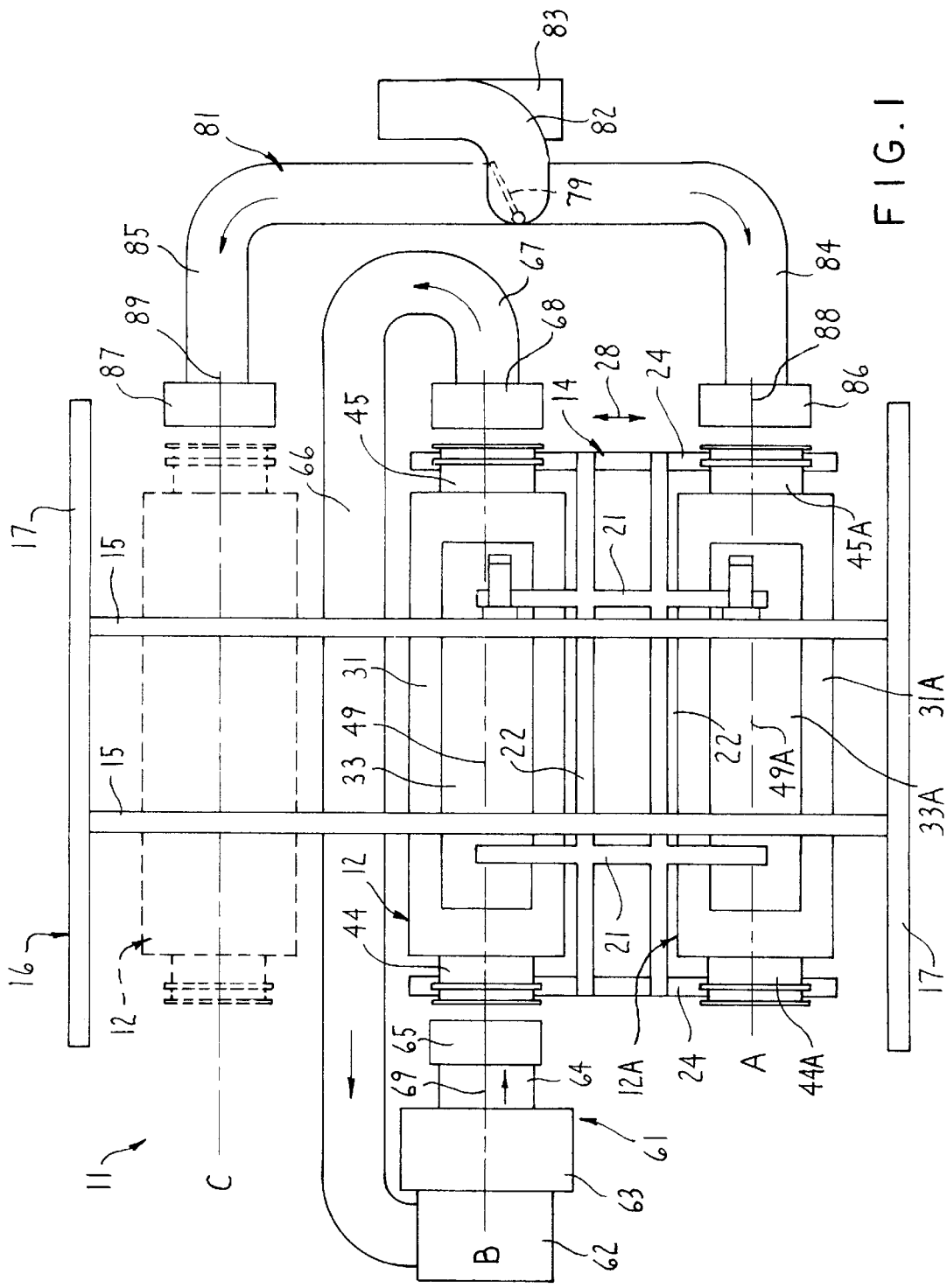
FIG. 1 is diagrammatic top plan view of a molding system according to the present invention.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used to refer to the normal direction of flow of air through the mold box, which flow of heated air through the mold box is from left to right in FIGS. 1 and 2. The words "inwardly" and "outwardly" will refer to directions toward and away from, respectively, the geometric center of the arrangement and designated parts thereof. Said terminology will include the words specifically mentioned, derivatives thereof, and words of similar import.

Detailed Description

Figure 2:
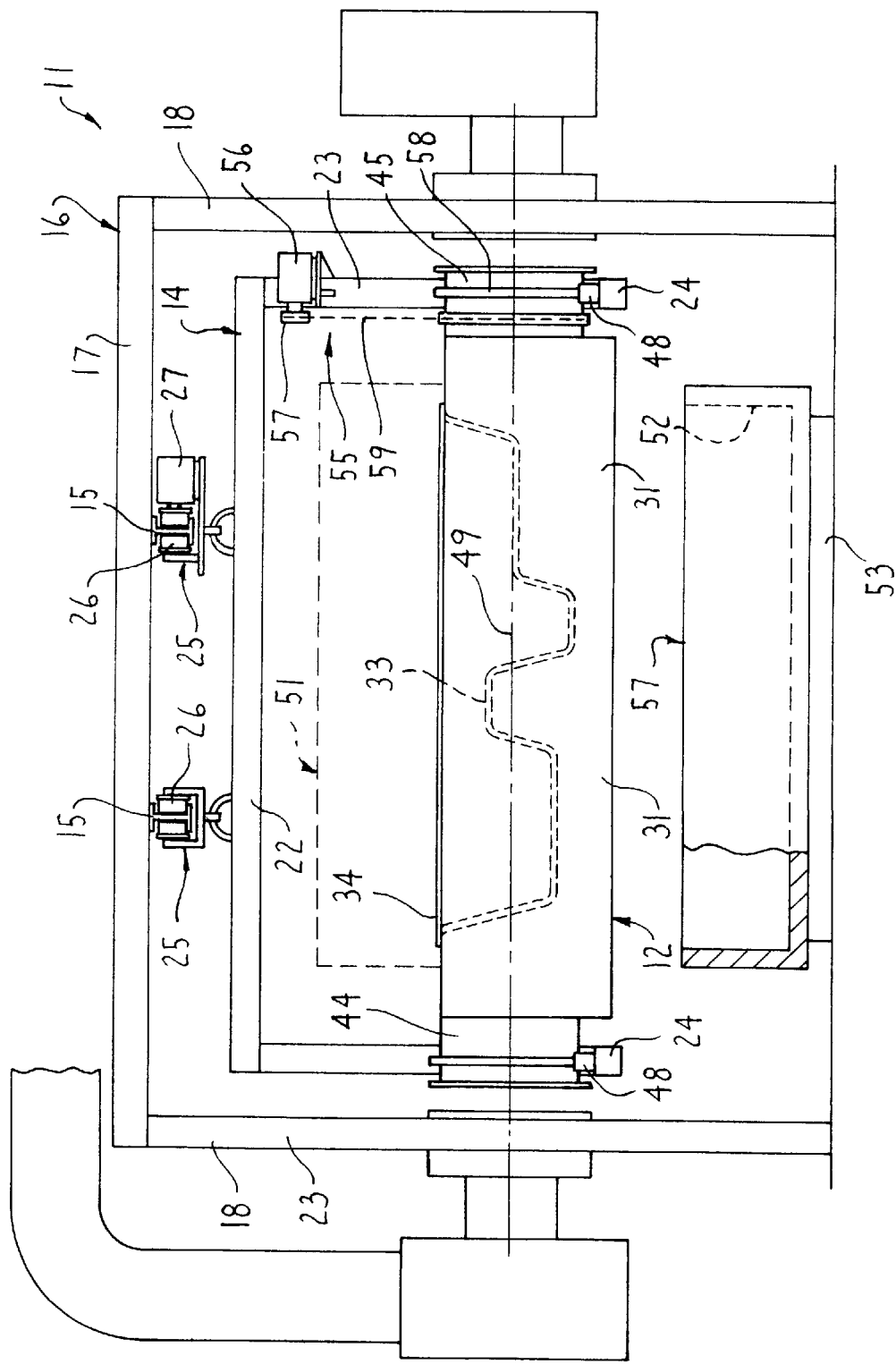
FIG. 2 is a diagrammatic front elevational view of the molding system shown in FIG. 1.

Referring to the drawings and specifically FIGS. 1 and 2, there is illustrated a molding system 11 according to the present invention. This system includes a pair of mold assemblies 12 and 12A which are carried on a movable carriage 14. The carriage 14 in turn is movably supported on a pair of parallel overhead rails 15 which extend generally horizontally and are supported in a suitable manner, as by a stationary frame 16.

The frame 16, in the illustrated embodiment, includes generally horizontally extending end rails 17 which are secured to opposite ends of the overhead rials 15 and extend transversely relative thereto. These end rails 17 in turn are supported on suitable upright support posts 18.

The carriage 14 includes top longitudinally extending arms or beams 21 which extend generally parallel with but are spaced slightly downwardly from the overhead rails 15. These top longitudinal arms 21 in turn are rigidly joined to a pair of top cross arms or beams 22 which extend transversely and, adjacent their outer ends, are rigidly joined to downwardly projecting vertical supports 23. These latter supports 23 at their lower ends are rigidly joined to generally parallel and horizontally elongated bottom supports or beams 24, the latter being horizontally elongate in generally parallel relation with the overhead rails 15.

The carriage 14 is suspended from the overhead rails 15 by a plurality of wheeled hanger assemblies 25, one being provided adjacent each end of each longitudinal top arm 21. Each wheeled hanger assembly 25 includes a pair of wheels or rollers 26 disposed in rolling engagement with the bottom flange of the respectively adjacent overhead rail 15, the latter being conventionally formed as an I-beam for supporting the wheels of the hanger. At least some of the wheeled hanger assemblies, typically those associated with one side of the carriage, have a reversible electric drive motor 27 associated therewith for driving the respective wheels 26 to permit the carriage 14 to be linearly moved in a back and forth fashion along the overhead rails 15, such movement being in the direction indicated by arrow 28 in FIG. 1.

Considering now the structure of the mold assembly 12, and referring specifically to FIGS. 1–2 and 4–6, the mold assembly includes a generally hollow mold box 31 which, in the illustrated embodiment, is horizontally elongated and defines an opening 32 in the side wall structure 38 thereof. A thin metal mold shell or tool 33 is stationarily mounted on the mold box 31 by being disposed within the opening 32, the mold shell 33 typically having a surrounding edge flange 34 which enables the mold shell to be stationarily and fixedly seated on the mold box so that the mold shell is positioned within the opening 32 and projects into the interior of the mold box. The mold shell 33, as is typical, has a significant three-dimensional shape which provides a generally irregular contour throughout the longitudinal and transverse extent thereof, which shape corresponds to the desired shape of the skin or shell product being molded.

The mold shell 33 defines therein a mold cavity 35 which opens inwardly from the outer side of the mold assembly, this mold cavity 35 being defined by the outer molding surface 36 of the mold shell. The mold shell is typically of rather thin and approximately uniform thickness, and has an inner or back surface 37 which has a configuration somewhat similar to the outer molding surface 36. This back surface 37 is positioned inside the mold box so as to define an interior surface of the mold assembly.

The mold box 31 has a longitudinally elongate and generally tubular side wall structure 38, the latter having the opening 32 formed therein and the mold shell 33 mounted thereon. This tubular side wall structure 38 extends between end walls 41 and 42. The side wall structure 38, in cooperation with the back surface 37 of the mold shell, define therebetween a hollow chamber 43 which extends longitudinally of the mold box between the end walls 41 and 42. Generally cylindrical sleeves or collars 44 and 45 are respectively coaxially mounted on and project outwardly from the end walls 41 and 42. The collars 44 and 45 respectively define coaxially elongated openings 46 and 47 therethrough, the latter being in communication with opposite longitudinally-spaced ends of the chamber 43. The collars 44 and 45 are rotatably supported on bearing structures 48 provided on the sidewardly-spaced but parallel bottom support beams 24 of the carriage 14, whereby the mold assembly 12 is supported on the carriage for rotation about a longitudinally extending axis 49 which is the axis of the collars 44 and 45.

The other mold assembly 12A is substantially identical in construction to the mold assembly 12, and accordingly corresponding parts of the mold assembly 12A are identified by the same reference numerals used to identify the mold assembly 12 except for the addition of an "A" thereto.

The mold assembly 12A is also supported on the carriage 14 for rotation about its longitudinal axis 49A, with the mold assemblies 12 and 12A being disposed in generally parallel but sidewardly-spaced relation so that, as illustrated by FIG. 1, the mold assemblies 12 and 12A are disposed horizontally adjacent one another with their rotational axes 49 and 49A being generally horizontally coplanar and extending generally perpendicularly with respect to the horizontal movement direction 28 of the carriage 14.

To permit forming of a molded skin product or shell, the mold assembly 12 (as well as the assembly 12A) is adapted to mount thereon a mold closure box 51 which typically contains therein a significant quantity of a desired plastic material, the latter typically being in powder or granular form and contained within the cavity 52 of the mold closure box 51. This latter box is typically supported below the mold assembly located at station B in FIG. 1, this being the mold assembly 12 in the illustrated embodiment. When the mold assembly 12 is rotated 180° so that the mold cavity faces downwardly, then the mold closure box 51 is lifted upwardly, as by a conventional lifting device 53, so that the mold closure box 51 is attached to the mold assembly 12 in a conventional manner so as to totally enclose the mold cavity. The mold assembly 12 having the closure box 51 attached thereto is then rotated through about 180° into an upper position so that the plastic granules or powder fall into the mold cavity 35 so as to contact the entire outer molding surface 36 of the mold member, the latter having already been preheated. Some of the plastic material immediately melts and adheres to the outer molding surface 36, and other of the material sufficiently melts or gels so as to create an adhered thickness of plastic material, which thickness is a function of the heat supplied to the mold shell and the surface temperature thereof. Thereafter the mold assembly is again rotated so that the mold cavity faces downwardly and the mold box 51 is lowermost, at which time the mold box is disconnected from the mold assembly and returned to its lowered position awaiting attachment for the next mold cycle, such as attachment to the other mold assembly 12A. The mold 12, after detachment of the mold closure box 51, is again rotated generally back into an approximate upward position and is subjected to further heating so as to permit complete melting of the adhered layer of plastic material throughout the thickness thereof to permit formation of the molded skin or shell. This molding process, particularly as it relates to the overall method and arrangement of the present invention, will be explained in greater detail hereinafter. The use and attachment of a mold closure box containing powder or granular plastic material therein, as briefly explained above, is conventional and further detailed description thereof is believed unnecessary.

To effect rotation of the individual mold assemblies 12 and 12A, each is provided with a drive arrangement 55 which, in the illustrated embodiment, includes a conventional electric motor 56 which is mounted on the carriage 14 and effects driving of sprockets 57 and 58 which are joined together by a drive chain 59. The sprocket 58 in the illustrated embodiment is secured to and extends around the collar 45 associated with one end of the mold assembly 12 or 12A to thus effect the desired rotation of the mold assembly, as supported on the carriage, about the respective axis 49 or 49A. It will be appreciated that this feature of rotatably driving the mold assembly is also conventional, and numerous conventional drive arrangements can be provided for such purpose.

As diagrammatically illustrated by FIG. 1, the carriage 14 and the two mold assemblies 12 and 12A mounted thereon, are shiftable between first and second positions, the first position being shown in FIG. 1 wherein the rear mold assembly 12 is in a center station designated station B, this being a heating position, and the other mold assembly 12A is in a front station designated station A, this being a cooling and product removing station. When the carriage 14 is shifted rearwardly (upwardly in FIG. 1) to its second position, then the front mold assembly 12A is moved into station B, and the rear mold assembly 12 is moved into a rearward station designated station C which is also a cooling and part removal station. The molding system thus includes two cooling and part removable stations A and C which are positioned on opposite sides of the heating and molding station B.

To supply heated air to the mold assembly located at station B to effect heating of the mold shell 33, the molding system 11 includes an air heating and supplying system 61 as diagrammatically illustrated in FIG. 1. This system 61 includes an air heating unit 62 and a blower 63 which supplies heated air to a hot air supply duct 64, the latter having a terminal end which opens horizontally in aligned relation with the adjacent end of the mold assembly, such as the collar 44. The free end of the air supply duct 64 terminates closely adjacent the collar 44, and a shiftable collar 65 is provided on the end of the duct 64 and is axially shiftable outwardly so as to permit it to move into engagement with the adjacent collar 44.

The illustrated heating and supplying system 61 also includes a return duct 66 which resupplies the heated air back to the heating unit 62. This return duct 66 has an inlet end portion 67 which is spaced from and generally aligned with the hot air supply duct 64, whereby this inlet end portion 67 of the return air duct is positioned so as to be closely adjacent and horizontally aligned with the end collar 45 of the mold assembly disposed at station B. This inlet end portion 67 has a surrounding collar 68 which is shiftable axially so as to move into engagement with the adjacent end of collar 45 of the mold assembly. The shiftable collars 65 and 68 as associated with the heated air ducts 64 and 67 thus define a generally horizontally extending axis 69 which generally aligns with the axis 49 or 49A of the mold assembly disposed at station B.

As to the movement of the shiftable collars 65 and 68, reference is made to FIG. 3 which illustrates therein a typical mechanism for effecting shifting of the collars, this being illustrated with reference to the collar 68. As indicated, this collar is slideably supported on the free end of the respective air duct, such as the duct portion 67, and a shifting mechanism is provided which includes a pair of support levers 71 which are disposed on opposite sides of the collar and are hinged at 72 to a stationary frame element 75. The levers 71 at their lower ends are hinged at 73 to opposite sides of the shiftable collar 68, these latter hinges 73 and their connection to the collar being provided with sufficient clearance to enable leftward slidable displacement of the collar 68 into engagement with the collar 45 in response to pivoting of the lever 71. The levers 71 in turn are pivoted by suitable actuators such as double-acting pneumatic cylinders 74 which have their rear or remote ends pivotally supported on the frame. All of the shiftable collars associated with the molding assembly can be similarly activated, or can be activated by any other conventional driving arrangement. When the appropriate collar is shifted forwardly into the position as indicated by dotted lines in FIG. 3, the collar effectively creates a continuous passage between the interior of the mold assembly and the appropriate exterior supply or return duct to thus provide for proper flow of air through the interior of the mold assembly.

When the mold assembly 12 and 12A is respectively disposed at stations C and A, the individual mold assembly is disposed so as to be connected to a two-position cooling system 81 which, as diagrammatically illustrated in FIG. 1, includes a cool air supply duct 82 which connects to a supplier blower 83, the latter typically being supplied with air from the surrounding environment so that the air is at a reasonably cool temperature. The supply duct 82 in turn joins to and supplies air to a pair of discharge ducts 84 and 85 which respectively communicate with stations A and C. A suitable flow control diverter or valve 79 may be provided so that the cool air can be controlled for supply to either station A or station C, depending upon which station is currently occupied by a mold assembly.

Figure 3:
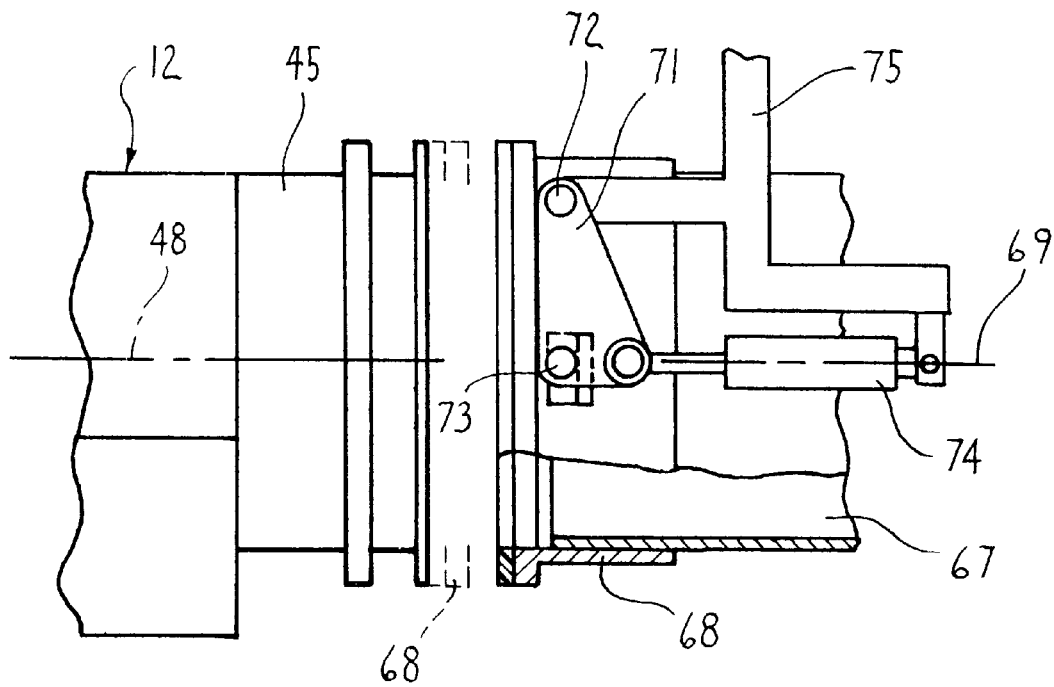
FIG. 3 is an enlarged, fragmentary view, partially in cross section, for illustrating the shiftable collars which connect the air ducts to the ends of the mold box.

The discharge ducts 84 and 85 have the discharge end portions thereof respectively provided with shiftable collars 86 and 87 which are operated in generally the same manner as the collar 68 illustrated in FIG. 3. The discharge ends of the discharge ducts 85 and 86, and the respective shiftable collars 87 and 88, thereby define flow discharge axes 88 and 89 respectively, which define the stations A and C and are adapted for alignment with the axes of the mold assemblies 12A and 12 when the latter are respectively disposed in stations A and C. The shiftable collars 86 and 87 are axially extendible so as to engage the adjacent collar 45A or 45 so that the discharge duct is in direct communication with the interior of the mold assembly to permit cool air to be supplied into and moved longitudinally through the mold assembly. The opposite end of the mold assembly, when disposed in stations A or C, can be permitted to discharge directly to the environment or, if desired, suitable return ducts can also be provided for communication with the discharge ends of the mold assemblies when disposed at stations A and C.

When a mold assembly such as the mold assembly 12 is disposed in the heating and molding station B, the heated air is supplied through duct 64 and thence through end collar 44 into the interior chamber 43 of the mold assembly, with the heated air flowing longitudinally through the interior chamber 43 and thence out the other end collar 45 for passage into the return duct 66. Due to the irregular configuration of the metal mold shell 33, however, parts of the mold shell protrude transversely into the chamber 43 and reduce the cross section of the chamber and effectively create an obstruction so that a greater quantity of heated air impacts against this obstruction, particularly when the obstruction is adjacent the inlet end of the air chamber 43. This can cause undesired excessive heating of certain areas of the back wall of the metal mold shell. On the other hand, such obstructions downstream thereof are often followed by cavities or recesses which result in a significant enlargement in the cross section of the chamber 43 as the air flows longitudinally therethrough, and these recesses are typically bordered by a downstream-facing back surface area in the mold shell, which wall areas or surfaces are often times inadequately heated since sufficient quantities of hot air do not circulate adjacent or impinge against these walls. Such walls thus do not receive sufficient heat as to achieve the desired melting and thickness of plastic buildup in the outer mold cavity. To provide for greater control over heating of the inner surface of the metal mold shell throughout the surface extent thereof, including both where the rear surface of the metal mold shell protrudes inwardly or defines recesses or cavities, including providing for more uniform control over the heating of the rear surface of the metal mold shell, the present invention provides the mold assembly 12 and 12A with a plurality of air flow control devices 91. Such flow control devices 91 are disposed both longitudinally along the chamber 91 and in transversely spaced relation about the rear surface of the metal mold shell so as to provide control over the amount of heated air which is permitted to access various portions of the back mold surface 37, particularly where this back mold surface 37 provides protrusions or cavities so as to result in significant cross-sectional nonuniformity in the air chamber 43.

In the preferred and illustrated embodiment, the flow control device 91 comprises a fan wheel 92 having a plurality of conventional blades which effect axial displacement of air in response to rotation of the fan wheel. This fan wheel 92 is nonrotatably mounted on the free end of an elongate shaft 93, the latter being cantilevered inwardly into the interior of the air chamber 43 in generally transverse relation to the longitudinal direction thereof. The shaft 93 projects outwardly through the side wall structure 38 of the mold box and is rotatably supported on a pair of suitable bearings 94, the latter in turn being carried by a support bracket 95 which is fixedly secured adjacent the exterior of the side wall structure 38. This latter bracket 95 also mounts thereon an electric motor 96 which in turn rotatably drives the shaft 93 through a suitable drive connector 97, the latter being a conventional belt-and-sprocket drive connection. The motor 96 is a conventional reversible and variable speed electric motor so as to provide for optimum control over the rotation of the fan wheel 92, and optimum control over the movement of heated air by the fan wheel. The shaft 93 is also preferably sufficiently elongate as to enable it to be axially adjusted inwardly and outwardly with respect to the mold box 31 to permit the bladed fan wheel 92 to be selectively positioned more closely adjacent or spaced from the rear surface of the mold, such as indicated by the dotted line position of the fan wheel in FIG. 6.

Figure 8:
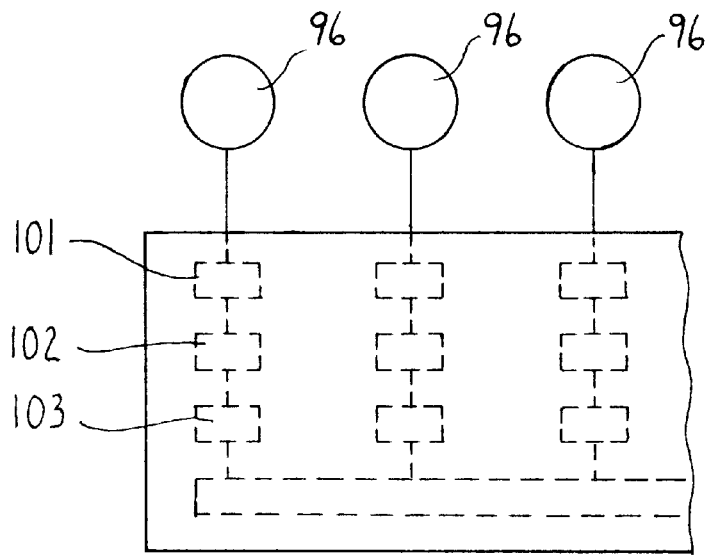
FIG. 8 diagrammatically illustrates the individual control functions which are capable with respect to the flow control devices associated with the mold box.

The plurality of flow control devices 91 are each provided with their own individually controllable drive motor 96, and the plurality of motors 96 are in turn controlled from a suitable control panel, as diagrammatically illustrated in FIG. 8, whereby each air flow control device 91 can thus be individually adjusted and regulated so as to provide for optimum transverse air flow relative to the adjacent surface area of the back of the metal mold shell to accordingly regulate the desired amount of heat supplied to this surface area. For example, each motor 96 can be controlled so as to control both the on and off times and accordingly the length of running time. Further, each motor can be controlled so as to rotate in a clockwise or counterclockwise direction, and hence when driven in one direction can be utilized to drive heated air transversely toward the adjacent back surface area of the metal shell to increase the amount of heat to this area, such being useful in those areas where a rear downstream surface or depression exists. Conversely, when the motor is driven in the opposite direction the fan blade will effectively suck heated air away from the metal mold shell and move it transversely toward the back of the mold box, thereby minimizing or reducing the amount of heated air and reducing the heating effect of the adjacent surface of the metal mold shell. In addition to this different direction of rotation and the different direction of air movement, the motor can also be adjusted in speed so as to vary the transverse air flow from either a small quantity variably up to a rather big quantity, and again providing rather precise regulation over the amount of heat which is applied to the adjacent back surface area of the metal mold shell.

The above control functions are diagrammatically indicated in FIG. 8 wherein, for the motor 96 as associated with each flow control device 91, there is provided a control 101 which regulates the on-off function of the motor, a further adjustable control 102 which regulates the direction of rotation of the motor, and a further adjustable control 103 which regulates the speed of the motor and the speed of the fan wheel. Such controls can obviously be incorporated into and comprise part of a suitable software controller, or a programmed logic controller, whereby the timing of the on-off functions, the direction of rotation and the speed of rotation can all be appropriately inputted by a keyboard, and can also be adjusted and varied by inputting new parameters such as control functions or control values.

The operation of the molding assembly 11 will now be briefly described to ensure a complete understanding thereof.

In operation, with the carriage 14 positioned as illustrated in FIG. 1, the mold assembly 12 is disposed in station B and heated air is supplied to and passed through the air chamber 43 thereof to effect preheating of the metal mold shell 33. With the mold assembly 12 disposed so that the mold shell faces downwardly, the mold closure box 51 is lifted upwardly and attached to the mold box 31 so as to enclose the mold cavity. The thus assembled mold assembly 12 is then rotated about 180° so that the mold closure box 51 is disposed uppermost. This enables the plastic material within the mold box 51 to fall downwardly into the mold cavity and contact the preheated surface 36 of the metal mold shell 33, thereby causing the plastic particles to immediately melt and create a thin skin which adheres to the outer mold surface 136. Depending upon the amount of preheat of the shell, together with any additional heating which continues at this point by supplying additional heated air into and through the air chamber 43, additional plastic material will effectively partially gel and stick together and create a buildup of a desired thickness, which thickness is controlled by the amount of heat provided by the mold shell. After a time period sufficient to create the desired buildup or thickness, the mold assembly is again rotated so that the mold box 51 is swung downwardly into a lowered position, causing the excess material in the mold cavity to fall back into the mold box, whereupon the mold box is detached from the mold assembly and returned to the lifting device. The mold assembly 12 is then again rotated back up to a position wherein the mold shell and the mold cavity generally face approximately upwardly, and additional heated air is again supplied into and through the air chamber 43 to effect sufficient heating of the mold shell to effect melting of the plastic buildup throughout the mold cavity to result in formation of a molded skin or shell which is of generally uniform or desired thickness having substantially uniform properties throughout.

After final heating of the mold assembly 12 to permit proper forming of the molded skin or shell, the supply of heated air to the mold assembly 12 is discontinued, and the shuttle 14 is moved rearwardly so that mold assembly 12 moves into station C, and the other mold assembly 12A moves into station B. At this point a new molding operation now takes place with respect to the mold assembly 12A located at station B, which mold operation is substantially the same as described above. Simultaneously therewith, however, cool air is supplied into and through the mold assembly 12 located at station C to effect rapid cooling of the mold assembly and of the molded skin or shell therein, after which the molded skin or shell is removed, and hence the mold assembly 12 is suitable for reuse when the shuttle 14 moves back to the position shown in FIG. 1.

With the process as described above, the rate at which molded shells can be produced is significantly increased since a single heating and molding station cooperates with two mold assemblies so as to carry out the actual heating and molding step, with the molding assemblies being moved into separate cooling and part removing stations so as to facilitate the overall rate of production. In this fashion, a single powder box and a single heating device are able to effectively and efficiently service two mold assemblies which are alternatively positionable in a single molding and heating station.

During the preheating and final heating of the mold assembly as described above, some or all of the various flow control devices 91 will be energized for appropriate periods of time, and at appropriate rotational directions and speeds, so as to provide for the desired degree of heat being supplied to the rear or back surface of the metal mold shell as the heated air flows longitudinally through the air chamber 43. The flow control devices 91 cause some of the heated air to be transversely displaced either toward or away from adjacent back surface areas of the mold shell so as to provide for more uniform supply and distribution of heat to the mold shell, and to thus compensate for irregularities in the mold shell cause by protrusions or cavities and the consequential change in the flow direction and cross sectional areas of the air chamber 43 caused by the shape of the metal mold shell.

Figure 9:
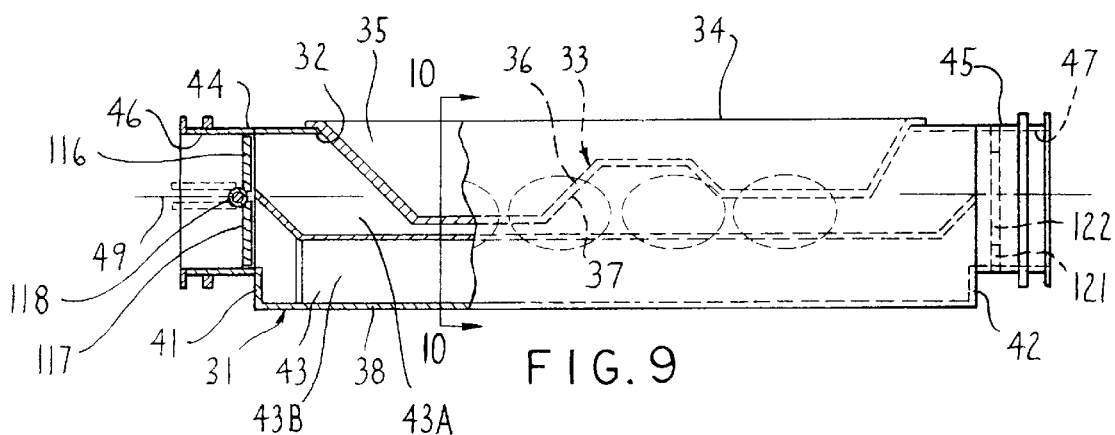
FIG. 9 is a side elevational view, partially in cross section, which is similar to FIG. 4 but illustrates therein modifications to the invention.
Figure 10:
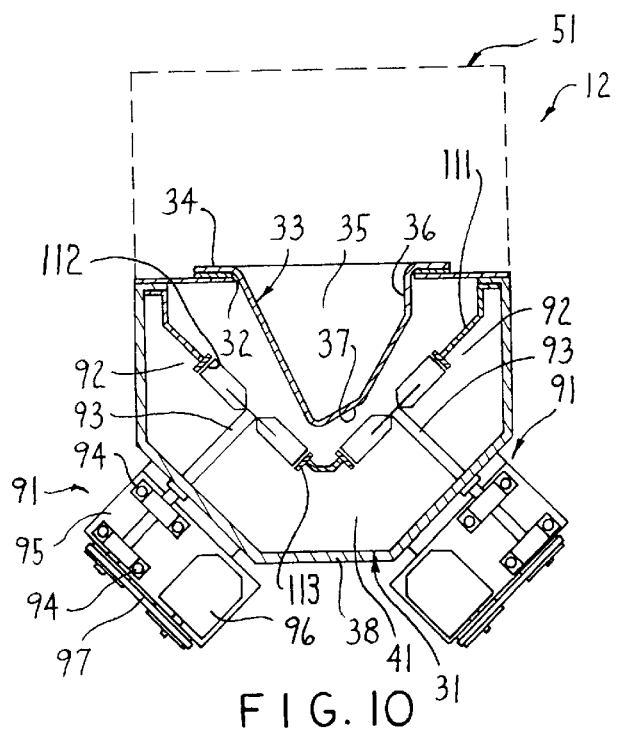
FIG. 10 is a sectional view taken generally along line 10—10 in FIG. 9.

Referring now to FIGS. 9 and 10, there are illustrated cross sectional views of a modified mold box which generally corresponds to the mold box illustrated by FIGS. 4–5, but in addition includes further divider or flow control elements associated with the interior of the mold box to assist in desirable control of the heated air therethrough.

More specifically, in this modification as illustrated by FIG. 9, the longitudinally elongate air chamber 43 as defined within the mold box 42 has a divider wall or partition 111 fixed therein and extending longitudinally therealong throughout the length of the mold shell 33. This partition 111 is disposed generally between the back surface of the mold 33 and the back wall 38 of the mold box, and effectively divides the air chamber 43 into two separate longitudinally-extending air chambers or passages designated 43A and 43B. The air chamber 43B is defined between the partition 111 and the walls of the mold box 31 so that this chamber 43 does not directly contact the mold shell 33. The other chamber 43A, however, is defined generally between the back surface 37 of the mold shell 33 and the partition 111.

The partition 111 and the longitudinally separated chambers 43A and 43B thus extend longitudinally throughout the length of the mold box generally corresponding to the length of the mold shell 33, and terminate in the vicinity of the opposite ends of the mold shell substantially as illustrated in FIG. 9.

As illustrated by FIG. 10, the partition 111 has openings 112 extending transversely therethrough for providing communication between the chambers 43A and 43B. Each opening 112 can be defined by a suitable sleevelike shroud 113 if necessary, with the diameter of this opening being only slightly larger than the diameter of the bladed wheel 92. Each bladed wheel 92 is positioned within one of these openings 112 to provide for greater control over transverse movement of heated air between the chambers 43A and 43B. The bladed wheels 92, due to their variable speed and selected bi-directional rotation, can be used to precisely control the quantity of heated air which is either withdrawn from chamber 43A and moved into chamber 43B, or vice versa. Each wheel 92 is individually speed controlled to control not only the quantity but also the direction of air movement at various circumferentially or longitudinally spaced locations along the back surface of the mold shell.

To provide for more optimum control of air flow into and through the longitudinal air chambers 43A and 43B, the inlet end 46 of the mold box is preferably provided with movable flow-control dampers. As shown in FIG. 10, a pair of swingable damper plates 116 and 117 are provided for independent swinging movement about a suitable hinge or pivot 118. The damper plates 116 and 117 in the illustrated embodiment are each approximately a one-half circle, with movement of the upper plate 116 controlling the amount of heated air supplied into the chamber 43A, and movement of the other damper 117 controlling the quantity of heated air supplied into the chamber 48B. The position of the two dampers 116 and 117 can be individually adjusted to thus optimize the flow and division of heated air into the chambers 43A and 43B.

A further modification of the mold box is also illustrated in FIG. 9, this being the provision of a flow-control orifice plate 121 located adjacent the discharge end of the chamber 43. This orifice plate, which is located adjacent or downstream of the partition 111, is preferably disposed in close proximity to the downstream end of the mold shell 33, and has a flow-control orifice 122 therein having a maximum flow cross sectional area which is preferably less than the cross sectional flow area at the input end of the mold box. In fact, the cross sectional area of the discharge orifice 122 is believed preferably to be the smallest flow control area throughout the entire hot air circulating system. The use of this flow control orifice 122 directly adjacent the discharge end of the mold box, or directly adjacent the downstream end of the mold shell, is believed to further increase the overall control over the hot air supplied to the mold box and the desired heating of the mold shell. This orifice plate can obviously be utilized in conjunction with the mold box illustrated in FIG. 4.

It will be appreciated that the heating and cooling systems illustrated and described herein are merely exemplary, and that other known types of heating and cooling systems can be utilized. For example, a liquid cooling system, such as a water cooling system, can be provided if desired, which system can again be provided so as to effect cooling of the mold assemblies when disposed in stations A and C. As for the heating system, a gas burning nozzle can be utilized for heating the air, and can be provided closely adjacent the inlet end of the mold assembly disposed at station B for creating a stream of heated air for supply into and through the air chamber 43.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mold assembly for molding thermoplastic particles into a solid thin shell, said mold assembly including a mold box defining therein a hollow interior, said mold box having a mold shell mounted thereon and defining a mold cavity which opens outwardly and is defined by a front surface of the mold shell, said mold shell and said mold box cooperating to define an interior air chamber which extends lengthwise of the mold box from one end to the other end thereof, each said end having an opening therethrough communicating with said air chamber, said mold shell having a back surface which defines part of the boundary wall of said air chamber, said mold box being adapted for connection to a source of heated air so that air is supplied to the opening in one said end and then flows lengthwise through said air chamber for discharge through the opening at the other said end, the improvement comprising:

a plurality of flow control devices positioned in spaced relationship within said air chamber for causing displacement of at least some of the heated air as it flows lengthwise through the air chamber in a transverse direction relative to a surface area of said back surface which is positioned in close proximity to the flow control device, each said flow control device including a rotatable shaft member and a bladed wheel nonrotatably mounted thereon, said shaft member defining a rotational axis which is transverse to the lengthwise extent of said air chamber, and said shaft member being adjustable to position the respective bladed wheel at a selected location relative to the respective said surface area of said back surface.

2. An assembly according to claim 1, wherein the bladed wheel associated with at least one of the flow control devices causes the heated air to be moved transversely away from an adjacent surface area of the back surface.

3. An assembly according to claim 1, wherein the bladed wheel associated with each flow control device is driven by its own reversible and variable speed electric motor.

4. An assembly according to claim 1, wherein several of said flow control devices are disposed in spaced relationship from one another along the lengthwise extent of said air chamber, wherein one of said flow control devices is disposed so that the bladed wheel thereof faces generally toward an inward protrusion on said mold shell and the bladed wheel is rotated in a direction so as to draw heated air away from the back surface of the inward protrusion, and wherein a further said flow control device is oriented such that the bladed wheel projects toward a depression formed in the back surface and the bladed wheel is rotated in a direction so as to cause heated air to be directed transversely toward the depression.

5. An assembly according to claim 1 wherein each said shaft member is axially adjustable to position said bladed wheel at a selected location relative to the respective said surface area of said back surface.

6. A mold assembly for molding thermoplastic particles into a solid thin shell, said mold assembly including a mold box defining therein a hollow interior, said mold box having a mold shell mounted thereon and defining a mold cavity which opens outwardly and is defined by a front surface of the mold shell, said mold shell and said mold box cooperating to define an interior air chamber which extends lengthwise of the mold box from one end to the other end thereof, each said end having an opening therethrough communicating with said air chamber, said mold shell having a back surface which defines part of the boundary wall of said air chamber, said mold box being adapted for connection to a source of heated air so that air is supplied to the opening in one said end and then flows lengthwise through said air chamber for discharge through the opening at the other said end, the improvement comprising:

a plurality of flow control devices positioned in spaced relationship within said air chamber for causing displacement of at least some of the heated air as it flows lengthwise through the air chamber in a transverse direction relative to a surface area of said back surface which is positioned in close proximity to the flow control device, said flow control devices being positionally adjustable relative to the respective said surface areas of said back surface, and said flow control device including a bladed wheel supported for rotation about an axis which extends transverse to the lengthwise extent of said air chamber and projects in generally intersecting relation relative to the back surface of the mold shell, said bladed wheel when rotating causing heated air within the air chamber to be displaced transversely with respect to the lengthwise direction; and said mold box including a partition wall extending along the lengthwise direction thereof which divides said air chamber into first and second chambers, said partition wall having openings therein for providing communication between said first and second chambers, each said bladed wheel being disposed in a corresponding one of said openings, said mold box further including first and second swingable and individually controllable damper plates disposed within a said opening in one said end of said mold box to respectively control the amount of heated air supplied to said first and second chambers.

7. A mold assembly for molding thermoplastic particles into a solid thin shell, said mold assembly including a mold box having a mold shell mounted thereon and defining a mold cavity which opens outwardly and is defined by a front surface of the mold shell, said mold shell and said mold box cooperating to define a hollow interior air chamber which extends longitudinally throughout the interior of said mold box and is in communication with a source of heated air, said mold shell having a back surface which defines part of the boundary wall of said air chamber, a plurality of flow control devices positioned in spaced relationship within said air chamber of said mold box for causing heated air in the air chamber to be transversely directed toward a surface area of said back surface to effect heating of the mold shell, each said flow control device including a rotatable shaft member disposed within said air chamber and nonrotatably mounting a bladed wheel thereon, said shaft member extending outside of said mold box and being drivingly connected to a motor disposed outside said mold box, said bladed wheels being disposed in spaced relationship from one another longitudinally and transversely of said hollow interior air chamber for causing heated air within the hollow interior air chamber to be displaced transversely relative to the back surface.

8. An assembly according to claim 7, wherein said hollow interior air chamber extends transversely between said mold shell and a side wall structure of said mold box and also extends longitudinally between opposite end walls of said mold box, said mold box having an air inlet opening adjacent one end thereof and an outlet opening adjacent an opposite end thereof, said bladed wheels being disposed within said hollow air chamber in spaced relation from said side wall structure of said mold box and spaced from said air inlet and outlet openings.

9. An assembly according to claim 7 wherein at least some of said bladed wheels are controllable to regulate the speed thereof.

10. An assembly according to claim 7, wherein said bladed wheels define respective air flows which are transverse with respect to the adjacent surface areas of said mold shell and at least some of said bladed wheels define respective air flows which are transverse with respect to other ones of said air flows so as to direct heated air toward the adjacent surface areas of the back surface having varying configurations.

11. An assembly according to claim 7 wherein each said bladed wheel is controllable to regulate the speed thereof.

* * * * *